United States Patent
Birk

(10) Patent No.: US 7,900,969 B2
(45) Date of Patent: Mar. 8, 2011

(54) CONNECTOR BETWEEN A REACTION PIPE AND A COOLING PIPE AND METHOD FOR CONNECTING A REACTION PIPE TO A COOLING PIPE

(75) Inventor: Carsten Birk, Berlin (DE)

(73) Assignee: Borsig GmbH (DE)

( * ) Notice: Subject to any disclaimer, the term of this patent is extended or adjusted under 35 U.S.C. 154(b) by 0 days.

(21) Appl. No.: 12/537,554

(22) Filed: Aug. 7, 2009

(65) Prior Publication Data

US 2010/0032471 A1 Feb. 11, 2010

(30) Foreign Application Priority Data

Aug. 8, 2008 (DE) .......... 10 2008 036 955

(51) Int. Cl.
*F16L 7/00* (2006.01)
(52) U.S. Cl. .............. 285/123.15; 285/130.1; 285/288.1; 165/154; 228/183
(58) Field of Classification Search ............... 285/123.3, 285/123.4, 123.15, 130.1, 288.1; 165/154; 228/183
See application file for complete search history.

(56) References Cited

U.S. PATENT DOCUMENTS

| | | | | |
|---|---|---|---|---|
| 4,079,967 A | * | 3/1978 | Schoessow | 285/288.1 |
| 4,700,773 A | * | 10/1987 | Kehrer | 165/158 |
| 4,997,211 A | | 3/1991 | Brücher | |
| 5,203,384 A | * | 4/1993 | Hansen | 141/59 |
| 5,350,011 A | * | 9/1994 | Sylvester | 165/135 |
| 5,579,831 A | | 12/1996 | Brucher | |
| 5,690,168 A | * | 11/1997 | Cizmar et al. | 165/154 |
| 5,732,981 A | * | 3/1998 | Brucher et al. | 285/905 |
| 5,813,453 A | | 9/1998 | Brucher | |
| 6,202,740 B1 | * | 3/2001 | Brucher et al. | 165/158 |
| 7,287,578 B2 | * | 10/2007 | Ricci et al. | 165/154 |

* cited by examiner

*Primary Examiner* — David E Bochna
(74) *Attorney, Agent, or Firm* — Robert W. Becker; Robert Becker & Assoc.

(57) ABSTRACT

Connector between a reaction pipe and a cooling pipe and method for connecting a reaction pipe to a cooling pipe. The cooling pipe is a double pipe having an inner pipe, disposed in the extension of the reaction pipe, and an outer pipe that surrounds the inner pipe to form an intermediate cooling space between them. A supply chamber is connected to the cooling space for supplying coolant thereto. A transition piece, connected to the reaction pipe, has a fork-shaped end portion composed of an inner portion and an outer portion with heat-insulating material between them. The outer portion is secured to the base of the supply chamber coaxially relative to the longitudinal axis of the cooling pipe. The supply chamber, transition piece and half shells form a prefabricated unit. An inner tube section is welded to, and extends out of, the supply chamber and is aligned with the inner portion of the transition piece. The inner tube section has a thickness, inner diameter and outer diameter corresponding to those of the inner pipe. The thickness, inner diameter and outer diameter of the half shells correspond to those of the outer pipe. The axial length of the half shells is greater than the length of the part of the inner tube section extending out of the supply chamber.

4 Claims, 1 Drawing Sheet

CONNECTOR BETWEEN A REACTION PIPE AND A COOLING PIPE AND METHOD FOR CONNECTING A REACTION PIPE TO A COOLING PIPE

BACKGROUND OF THE INVENTION

The invention relates to a connector between a reaction pipe of a reaction furnace and a cooling pipe of a reaction gas cooler, as well as to a method for connecting a reaction pipe of a reaction furnace to a cooling pipe of a reaction gas cooler, wherein the cooling pipe is embodied as a double pipe having an inner pipe and an outer pipe, wherein the inner pipe is disposed in an extension of the reaction pipe and the outer pipe surrounds the inner pipe such as to form an intermediate cooling space between them.

Pyrolysis or ethylene reaction furnaces form, within the ethylene unit, the heating element for the production of the base materials ethylene, propylene, butadiene, etc. for the plastics industry.

Saturated hydrocarbons, primarily ethane, propane, butane, LNG, naphtha and oil gas are used as starting materials. The conversion of the saturated hydrocarbons into the unsaturated hydrocarbons takes place in the reaction pipe at inlet temperatures of 500-680° C. and outlet temperatures of 775-875° C., and in a pressure range of 1.5-5 bar.

In downstream reaction gas coolers at the furnace discharge, the unsaturated hydrocarbons (also known as reaction gases) are cooled off from 775-875° C. to about 350-450° C. accompanied by the formation of high or low pressure vapor. The "cooling water" has a boiling or distillation temperature at an appropriate pressure. The cooling takes place due to the phase transition from liquid to vapor.

The reaction gas cooler is composed of one or more double pipes, whereby the reaction gas that is to be cooled off is disposed in the inner pipe, and the cooling water is disposed in the outer pipe, in other words, about the inner pipe. Depending on the type of furnace, the reaction gas can enter the reaction gas cooler from below and flow upwardly, or can enter from above and flow downwardly.

The cooled double pipe of the reaction gas cooler is connected by a special transition piece with the reaction pipe that extends out of the reaction furnace. This transition piece is either cooled with vapor, or is designed as an uncooled component that is filled with heat-insulating material. Such an uncooled transition piece is known from DE 39 10 630 C3, and is comprised of an expanded, fork-shaped tube end having an inner section and an outer section. The space present between the two sections is filled with a heat-insulating material. Merely the outer section of the transition piece is connected to the reaction gas cooler, while a play is maintained in the radial and axial directions between the inner section of the transition piece and the cooling pipe of the reaction gas cooler.

The uncooled transition piece known from DE 39 10 630 C3 has the advantage relative to the cooled transition piece that at the point of connection the wall temperatures are nearly the same, thus avoiding thermal stresses. Despite this clear advantage, in older reaction gas units cooled transition pieces are still in use. There is a need in existing reaction gas units to replace the exiting cooled transition pieces with uncooled transition pieces.

A single-tube heat exchanger for the cooling of reaction gas is known from EP 718 579 B1 and EP 810 414 B1; it is provided with a special supply chamber for the coolant. The supply chamber is comprised of individual interconnected sections of a solid strip-like part, into which is respectively inserted a single recessed portion that surrounds the inner pipe. The inner pipe of the cooling pipe, which is embodied as a double pipe, is welded into the base of the supply chamber while the outer pipe of the double pipe is welded onto that part of the supply chamber that is disposed beyond the recessed portion. Also with this heat exchanger the connection to the reaction furnace is effected by means of an uncooled transition piece that contains heat-insulating material and is provided with a fork-shaped expansion. With this heat exchanger, each cooling pipe can be controlled individually and in a precise manner, and the supply chamber is rigid enough to withstand the high pressure of the coolant without additional reinforcements. A tangential supply of the coolant produces a rotating coolant flow, which ensures a good cooling of the base of the supply chamber and counteracts an undesired depositing of particles out of the coolant.

The object of the invention is to provide a connector having a high precision that can be subsequently installed in existing units on location with reduced expense between an uncooled cooling pipe of a reaction furnace and a cooled pipe of a reaction gas cooler.

SUMMARY OF THE INVENTION

The object is inventively realized with a connector that comprises a supply chamber connected to the intermediate cooling space for supplying a coolant thereto; a transition piece connected to the reaction pipe and having an end portion with a fork-shaped configuration composed of an inner portion and an outer portion, wherein a layer of heat-insulating material is disposed between the inner and outer portions and the outer portion is secured to the base of the supply chamber coaxially relative to the longitudinal axis of the cooling pipe; half shells, wherein the supply chamber, the transition piece and the half shells are embodied as a prefabricated unit; and an inner tube section welded into the supply chamber and extending out of the supply chamber and aligned with the inner portion of the transition piece, wherein the inner tube section has a thickness, inner diameter and outer diameter that correspond to the thickness, inner diameter and outer diameter of the inner pipe, wherein the thickness, inner diameter and outer diameter of the half shells correspond to the thickness, inner diameter and outer diameter of the outer pipe, and wherein the axial length of the half shells is greater than the length of that part of the inner tube section that extends out of the supply chamber. The method for connecting the reaction pipe to the cooling pipe includes the steps of pre-assembling the transition piece and the supply chamber to form a unit, welding the inner tube section onto the inner tube of the cooling pipe, disposing the half shells about that part of the inner tube section that extends out of the supply chamber, welding the half shells to one another, welding a first end face of the half shells to the outer pipe of the cooling pipe, welding a second end face of the half shells to the supply chamber, and welding the transition piece to the reaction pipe.

The inventive two-part connector represents a repair unit or upgrading set. The prefabricated unit, in addition to the supply chamber, already contains the transition piece, so that the critical, due to high stress weld seam between the supply chamber and the transition piece is carried out with an automatic welding in the factory with high quality and precision. Welding operations on location in the unit, such as the connection of the half shells to one another and to the inner pipe and the outer pipe of the cooling pipe, as well as the connection of the transition piece to the reaction pipe, can be carried out as simple manual welding operations.

BRIEF DESCRIPTION OF THE DRAWINGS

One embodiment of the invention is illustrated in the drawing, which will be described in detail in the following and in which.

DESCRIPTION OF SPECIFIC EMBODIMENTS

Figure 1:
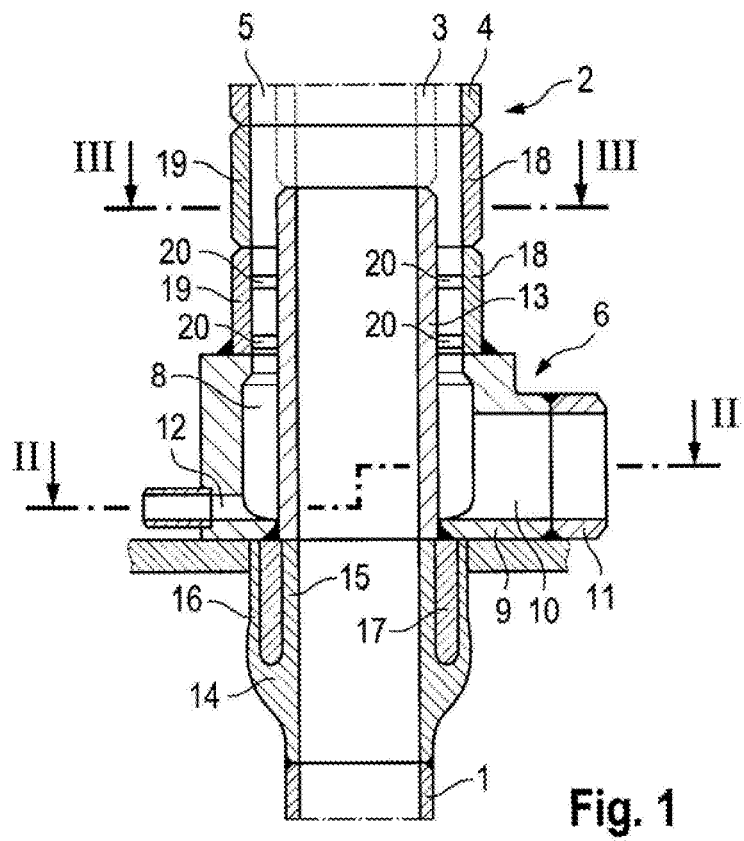
FIG. 1 is a longitudinal cross-section through a connector between reaction pipe and reaction gas cooler.
Figure 2:
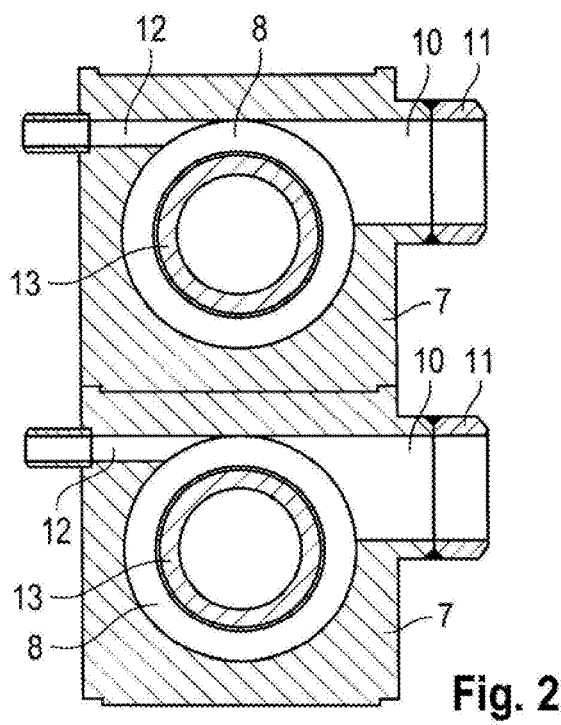
FIG. 2 shows the cross-section II-II of FIG. 1.
Figure 3:
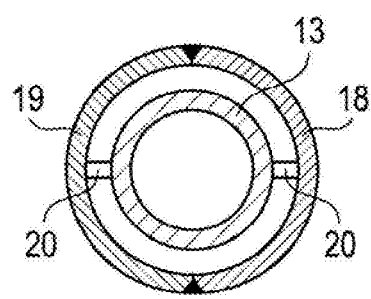
FIG. 3 shows the cross-section III-III of FIG. 1.

FIG. 1 shows a connector between an uncooled reaction pipe 1 of a non-illustrated reaction furnace, and a cooling pipe 2 of a reaction gas cooler. The reaction gas cooler, of which only that inlet part that is essential for the invention is shown, contains several cooling pipes 2, which are embodied as double pipes having an inner pipe 3 and an outer pipe 4. Disposed between the inner pipe 3 and the outer pipe 4 is an intermediate cooling space 5, through which flows a coolant at high pressure. The outer pipe 4 is set back relative to the inner pipe 3.

The intermediate cooling space 5 between the inner pipe 3 and the outer pipe 4 is connected to a supply chamber 6 for the supply of the coolant. The supply chamber 6 is composed in particular of a solid, strip-like part that is divided into individual sections 7, which are interconnected in a form-locking manner.

Formed in each section 7 of the supply chamber 6 is a recessed portion 8 that has a circular cross-section, with a cooling pipe 2 being associated with each of the recessed portions. The recessed portion 8 is formed to such a depth in the part that forms the supply chamber 6 that an annular base 9 having a residual thickness that is designated for the high inner pressure remains.

At the level of the base 9, a bore 10 opens out, preferably tangentially, into each recessed portion 8. Each of the bores 10 is connected to a non-illustrated supply conduit for the coolant via a supply connection 11. The coolant enters the recessed portion 8 through the bore 10 at a high speed, and produces a rotating flow about the cooling pipe 2. This flow ensures a good cooling of the base 9 of the recessed portion 8, and prevents particles from being deposited upon the base 9. Such a deposit leads to damaging localized overheating.

The recessed portion 8 is provided with a further bore 12, which at the level of the base 9 is guided outwardly. By means of the further bore 12, during the operation of the reaction gas cooler the particles that have collected in the recessed portion 8, and that rotate with the flow of the coolant, can be discharged. In addition, the recessed portion 8 and the base 9 can be inspected from the outside through the bore 12 with an endoscope.

Welded into the annular base 9 of the supply chamber 6 is an inner tube section 13, the outer diameter of which is less than the inner diameter of the recessed portion 8, so that a free space is formed within the recessed portion 8 that is in communication with the supply connection 11. The inner diameter, the outer diameter and the thickness of the inner tube section 13 are the same as the corresponding dimensions of the inner pipe 3 of the cooling pipe 2. The inner tube section 13 extends out of the supply chamber 6.

That end of each reaction pipe 1 at the outlet side is connected to a transition piece 14. The transition piece 14 is widened in a fork-shaped manner, and forms an inner portion 15, which is disposed in the extension of the reaction pipe 1, and an outer portion 16, both of which are interconnected at one end. The outer portion 16 of the transition piece 14 is welded to that side of the supply channel 6 that faces the reaction pipe 1. The inner portion 15 of the transition piece 14 is axially spaced from the inner tube section 13 by approximately a few millimeters. The intermediate space between the inner portion 15 and the outer portion 16 of the transition piece 14 is filled with a layer of heat insulating material 17.

That part of the inner tube section 13 that extends out of the supply chamber 6 is surrounded by half shells 18, 19 at a distance that corresponds to the width of the intermediate cooling space 5 within the cooling pipe 2. To exactly maintain this distance or spacing, at least two spacers 20 are mounted on the outer side of the inner tube section 13, the height or length of which corresponds to the width of the intermediate cooling space 5 within the cooling pipe 2.

The inner diameter, the outer diameter and the thickness of the half shells 18, 19 are the same as the corresponding dimensions of the outer pipe 4. In the extension of the outer pipe 4, the half shells 18, 19 are welded with the outer pipe and also with one another and with the supply chamber 6 on that side that faces the cooling pipe 2. The inner diameter of the half shells 18, 19 corresponds to the inner diameter of the recessed portion 8, thereby providing a connection between the supply chamber 6 and the intermediate cooling space 5.

The half shells 18, 19 and the prefabricated unit that includes the supply chamber 6 with the welded-on transition piece 14 and the welded-in inner tube section 13, together form a repair unit ("upgrading set"), that can be used in an existing installation. For this purpose, in the existing installation the supply chamber with the old transition piece is removed, whereby the inner pipe 3 and the outer pipe 4 of the cooling pipe 2 are separated off in such a way that, as shown in FIG. 1, the inner pipe 3 extends out of the outer pipe 4. Furthermore, the reaction pipe 1 is severed close to the supply chamber 6. A further disassembly of the reaction gas cooler is not necessary.

The prefabricated unit that includes the supply chamber 6 with the welded-on transition piece 14 and the welded-in inner tube section 13 is manually welded via the inner tube section 13 to the inner pipe 3. The half shells 18, 19 are disposed about that part of the inner tube section 13 that extends out of the supply chamber 6, and are similarly manually welded to one another and on one end face with the outer pipe 4 and on the other end face with that side of the supply chamber 6 that faces the cooling pipe 2. Subsequently, the transition piece 14 is manually welded to the reaction pipe 1.

To be able to utilize the aforementioned advantages of the described supply chamber 6 and the uncooled transition piece 14 with an existing reaction gas cooler, it is not necessary to disassemble the reaction gas cooler and to mount an appropriately retrofitted, new reaction gas cooler. It is merely necessary to separate the existing reaction gas cooler that is to be modified from the reaction furnace, to remove the existing supply chamber 6 with the old transition piece 14 as well as a small portion of the inner pipe 3 and outer pipe 4, and to replace them with the inventive repair set ("upgrading set"). This shortens the conversion time, so that the installation is rapidly again available with improved technology.

The specification incorporates by reference the disclosure of German priority document DE 10 2008 0336 955.1 filed Aug. 8, 2008.

The present invention is, of course, in no way restricted to the specific disclosure of the specification and drawings, but also encompasses any modifications within the scope of the appended claims.

I claim:

1. A connector for disposition between a reaction pipe of a reaction furnace and a cooling pipe of a reaction gas cooler, wherein the cooling pipe is embodied as a double pipe having an inner pipe and an outer pipe, wherein the inner pipe is disposed in an extension of the reaction pipe and the outer pipe surrounds the inner pipe such as to form an intermediate cooling space between the inner pipe and the outer pipe, and wherein the connector comprises:
 a supply chamber adapted to be connected to the intermediate cooling space for supplying a coolant thereto;
 a transition piece adapted to be connected to the reaction pipe, said transition piece having an end portion, remote from the reaction pipe, with a fork-shaped configuration and composed of an inner portion and an outer portion, wherein a layer of heat-insulating material is adapted to be disposed between said inner portion and said outer portion, and wherein said outer portion of said transition piece is secured to a base of said supply chamber coaxially relative to a longitudinal axis of the cooling pipe;
 half shells, wherein said supply chamber, said transition piece and said half shells are embodied as a prefabricated unit; and
 an inner tube section welded into said supply chamber, wherein said inner tube section extends out of said supply chamber and is aligned with said inner portion of said transition piece, wherein said inner tube section has a thickness, inner diameter and outer diameter that correspond to a thickness, inner diameter and outer diameter of the inner pipe, wherein a thickness, inner diameter and outer diameter of said half shells correspond to a thickness, inner diameter and outer diameter of the outer pipe, and wherein an axial length of said half shells is greater than the length of that part of said inner tube section that extends out of said supply chamber.

2. A connector according to claim 1, wherein spacers are provided on an outer surface of that part of said inner tube section that extends out of said supply chamber, and wherein a height or length of said spacers corresponds to a width of the intermediate cooling space formed between the inner pipe and the outer pipe of the cooling pipe.

3. A connector according to claim 1, wherein said supply chamber is comprised of a solid strip-like piece or of a plurality of interconnected sections of a solid strip-like piece, wherein a circular recessed portion is provided in said piece or said sections of said piece, wherein one side of said recessed portion is closed off while maintaining a thin base of said strip-like piece, and wherein said inner tube section is welded into said base.

4. A method of connecting a reaction pipe of a reaction furnace with a cooling pipe of a reaction gas cooler using the connector of claim 1, including the steps of:
 preassembling said transition piece and said supply chamber to form a unit,
 welding said inner tube section onto the inner pipe of the cooling pipe,
 disposing said half shells about that part of said inner tube section that extends out of said supply chamber,
 welding said half shells to one another,
 welding a first end face of said half shells to the outer pipe of the cooling pipe,
 welding a second end face of said half shells to said supply chamber, and
 welding said transition piece to the reaction pipe.

* * * * *